(No Model.)
F. OHM
COFFEE POT.
No. 259,580.  Patented June 13, 1882.
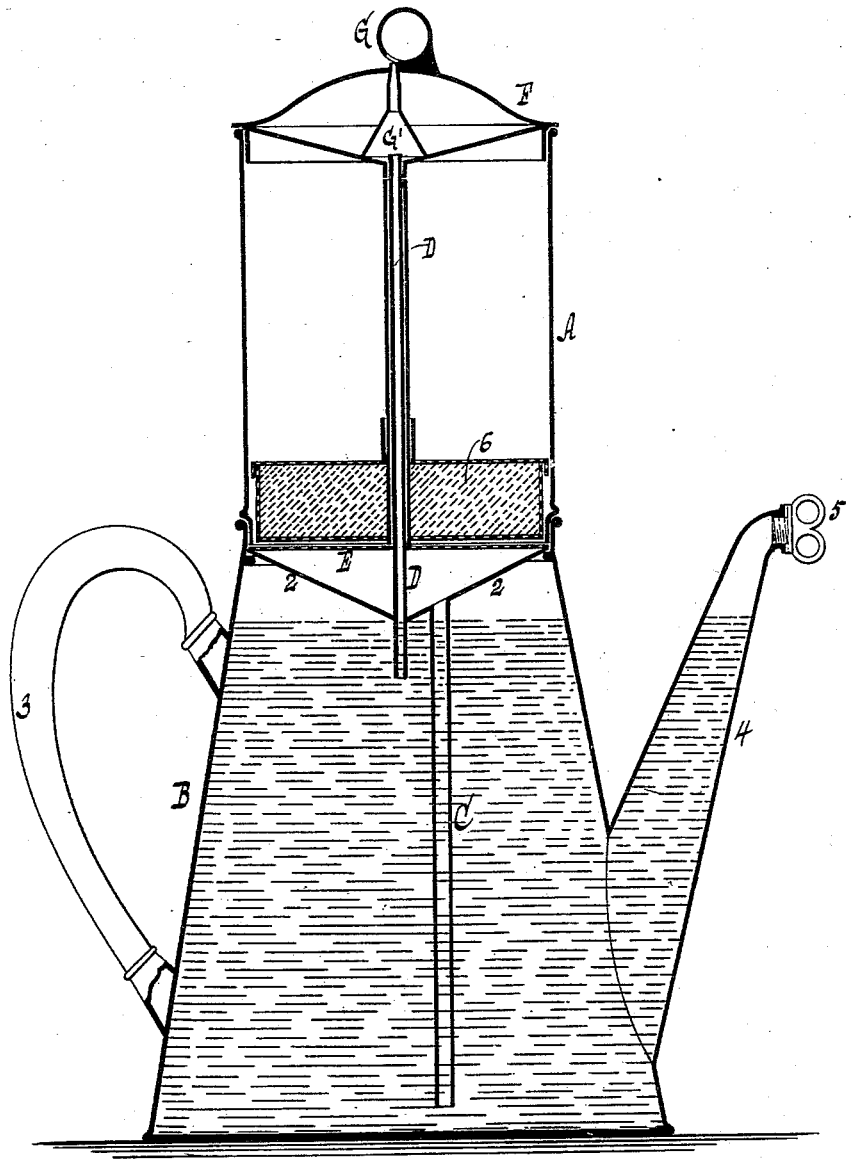
Witnesses
Otto Hufeland
William Miller
Inventor
Fritz Ohm.
by Van Santvoord & Hauff
his att'ys

UNITED STATES PATENT OFFICE.

FRITZ OHM, OF BROOKLYN, NEW YORK.

COFFEE-POT.

SPECIFICATION forming part of Letters Patent No. 259,580, dated June 13, 1882.

Application filed January 28, 1882. (No model.)

*To all whom it may concern:*

Be it known that I, FRITZ OHM, a citizen of the United States, residing at Brooklyn, in the county of Kings and State of New York, have invented new and useful Improvements in Coffee or Tea Pots, of which the following is a specification.

This invention consists in a coffee or tea pot wherein are combined an upper and a lower chamber, a water-pipe extending from the bottom of the upper chamber into the lower chamber, and a steam-pipe extending from the top of the upper chamber into the lower chamber, said water-pipe terminating near the bottom and the steam-pipe near the top of the lower chamber, a foraminous false bottom to the upper chamber and a lid to the upper chamber, carrying a whistle adapted to connect with the steam-pipe, so that if the lower chamber is filled with water and the coffee or tea is placed in the upper chamber the steam generated by heating or boiling the water acts thereon to force it up through the water-pipe into the upper chamber, bringing the water in contact with the coffee or tea, while when the water sinks below the lower terminal of the steam-pipe the steam escapes thereby and acts on the whistle to sound an alarm.

This invention is illustrated in the accompanying drawing, which represents a vertical central section.

The letter A designates the upper chamber, and B the lower chamber; C, the water-pipe; D, the steam-pipe; E, the false bottom of the upper chamber; F, the lid thereof, and G the whistle of the lid.

The chambers A B may be permanently connected or made detachable, and they are divided by a solid partition, 2, which is preferably made funnel-shaped, and which forms the main bottom of the upper chamber.

The lower chamber, B, is provided with an ordinary handle, 3, and spout 4, which latter may be furnished with an air-tight mouthpiece, 5.

The water-pipe C extends from the bottom 2 of the upper chamber, and the steam-pipe D from the top part thereof downward into the lower chamber, B, the lower terminal of the water-pipe being near the bottom of the lower chamber and that of the steam-pipe near the top thereof.

The false bottom E of the upper chamber is made of wire-gauze or other foraminous material, and rests on the edge of its funnel-shaped main bottom.

The lid F is fitted on the open top of the upper chamber, A, in any usual or suitable manner, and the whistle G is fixed on the lid in a suitable manner to connect or communicate with the steam-pipe D when the lid is put in place, such whistle consisting in this example of a hollow body having a hole against the edge of which the steam that may ascend in the steam-pipe is deflected by a horn, G'.

In applying the vessel to use the lower chamber, B, is filled with water to a point above the lower terminal of the steam-pipe D, so as to shut off this pipe by the water, and a suitable quantity of coffee or tea is placed in the upper chamber, a good result being obtained by inclosing the coffee or tea in a foraminous holder, b, fitted into the upper chamber. The pot is then put on the fire, and when the water becomes sufficiently heated for the generation of steam it is thereby forced through the water-pipe C into the upper chamber, A, and into contact with the coffee or tea, producing a decoction thereof, while as soon as the water sinks below the lower terminal of the steam-pipe D the steam escapes through this pipe and is caused to act on the whistle, thus sounding an alarm. The pot is then removed from the fire and the decoction is allowed to run from the upper chamber into the lower chamber through the water-pipe C, so as to commingle with the remaining water.

What I claim as new, and desire to secure by Letters Patent, is—

The combination, substantially as hereinbefore described, of the upper or decoction chamber and the lower or water chamber, the water-pipe extending from the bottom of the upper chamber into the lower chamber, the steam-pipe extending from the top part of the upper chamber into the lower chamber, the lower terminal of the water-pipe being near the bottom, and that of the steam-pipe near the top, of the lower chamber, the foraminous false bottom to the upper chamber, and the lid to the upper chamber, constructed with a whistle adapted to connect with the steam-pipe.

In testimony whereof I have hereunto set my hand and seal in the presence of two subscribing witnesses.

FRITZ OHM. [L. S.]

Witnesses:
RUDOLPH FISCHER,
E. F. KASTENHUBER.